R. A. SOMMERVILLE.
DEVICE FOR CLEARING WASTE PIPES.
APPLICATION FILED JUNE 19, 1909.
964,575.
Patented July 19, 1910.
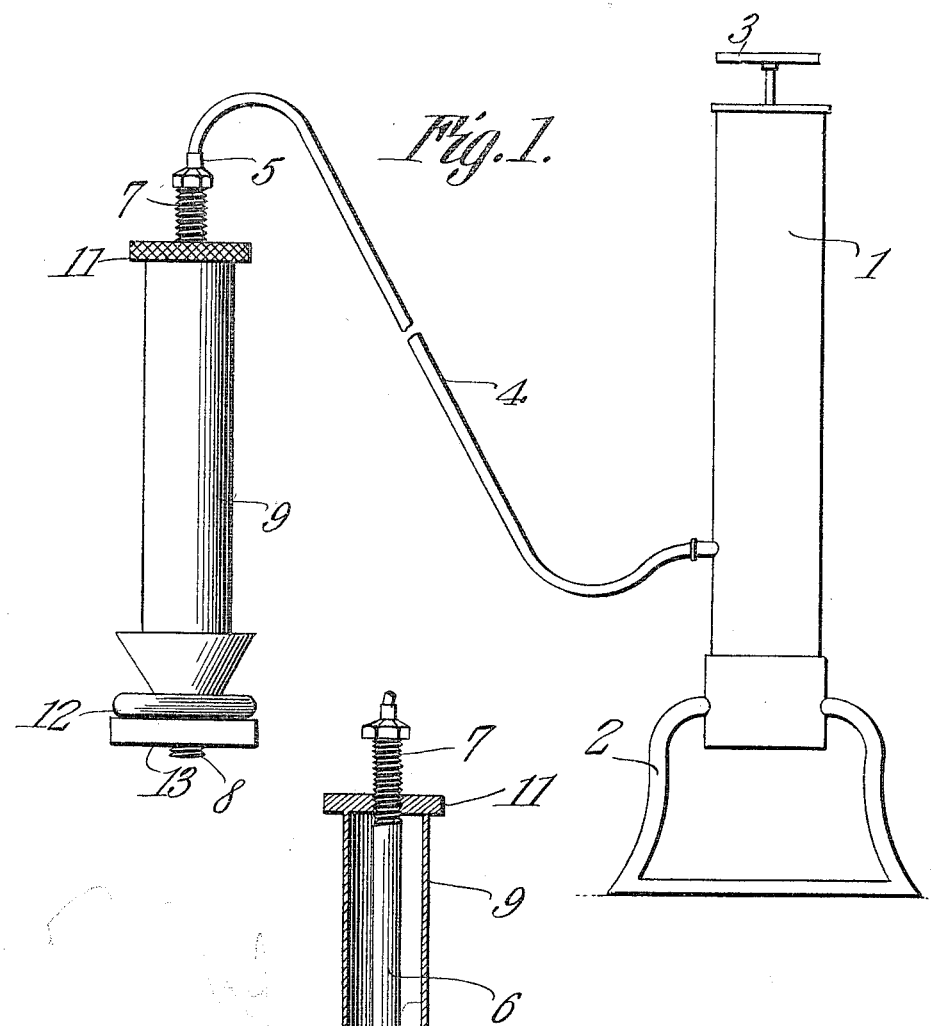
Robert A. Sommerville,
Inventor

UNITED STATES PATENT OFFICE.

ROBERT A. SOMMERVILLE, OF SKIDMORE, TEXAS.

DEVICE FOR CLEARING WASTE-PIPES.

964,575.      Specification of Letters Patent.      Patented July 19, 1910.

Application filed June 19, 1909. Serial No. 503,213.

*To all whom it may concern:*

Be it known that I, ROBERT A. SOMMERVILLE, a citizen of the United States, residing at Skidmore, in the county of Bee and State of Texas, have invented a new and useful Device for Clearing Waste-Pipes, of which the following is a specification.

This invention relates to improvements in devices for clearing waste pipes and other plumbing fixtures and the object of the invention is to produce a device of simple construction, which may be readily operated by unskilled persons and will prove efficient for the desired purpose.

The invention consists in a device adapted for attachment to an ordinary air-pump and arranged to be fitted in the end of the waste-pipe or other fixture and so manipulated as to provide an air-tight joint therewith.

The invention also consists in certain novel details which will be hereinafter first fully described and then particularly pointed out in the appended claims.

In the accompanying drawings, which fully illustrate the invention,—Figure 1 is an end elevation of my improved device operatively connected to an ordinary air-pump such as is commonly employed for inflating bicycle tires. Fig. 2 is a detail vertical longitudinal section of the attachment.

Referring particularly to the drawings by reference numerals, 1 denotes an air-pump which is provided at its lower end with a foot-brace 2 and is operated by means of a handle 3, as will be readily understood, and is provided with a flexible air-conducting tube 4 having an ordinary valve at its free end, which valve is indicated at 5.

In carrying out my invention, I employ a tube or pipe 6 which is threaded at both ends, as indicated at 7 and 8, and is adapted to be engaged at its upper end by the coupling of the valve 5, as will be readily understood. Surrounding the pipe or tube 6 is a cylindrical casing 9 which is provided at its lower end with a tapered head 10 and bears against or is formed with a nut or operating head 11 at its upper end, which nut or head is engaged upon the threaded portion 7 of the tube 6, as clearly shown in Fig. 2. The drawing shows this nut or head 11 as formed integral with the casing 9, but it is obvious that the nut might be formed separately from the casing and simply bear upon the upper end of the same. The lower tapered head 10 of the casing bears upon an elastic washer 12, which is fitted on the tube 6 and is held thereupon by a nut 13 mounted on the lower threaded portion 8 of said tube.

When it is desired to use the device to force obstructions from waste pipes or other parts of household plumbing, the end 8 of the tube 6 is inserted in the waste pipe. The head or nut 11 is then rotated so as to ride downward on the tube 6 and thereby carry the casing 9 against the washer 12 so as to compress the same against the nut 13 and thereby expand the washer so that it will effectually close the waste pipe and form an air-tight engagement with the walls of the same. The valve 5, at the end of the flexible conductor 4, being then fitted on the upper end of the tube 6, the air-pump is operated in the usual manner to force air through the tubes 4 and 6 into the waste pipe, and the air being compressed within the waste pipe will in a short while release the obstruction and force it through the pipe into the sewer.

The device is obviously simple in its construction and may be operated by any unskilled person to produce the desired results.

What is claimed is:—

1. In a device for the purpose set forth, the combination of a central air tube, a washer on the lower end of the same, a casing mounted around the tube and having a tapered head engaging the bore of the said washer, and means for moving the casing longitudinally with respect to the tube to extend the sides of the washer.

2. In a device for the purpose set forth, the combination of a central air tube, a washer on the lower end of the said tube, a casing inclosing the tube and having a tapered head at its lower end engaging the bore of the washer, and an operating nut mounted on the upper end of the tube to force the casing against the washer to compress the same.

In testimony that I claim the foregoing as my own, I have hereto affixed my signature in the presence of two witnesses.

ROBT. A. SOMMERVILLE.

Witnesses:
     D. G. MADRAY,
     F. P. RYAN.